(12) United States Patent
Kirisken

(10) Patent No.: US 11,181,983 B2
(45) Date of Patent: Nov. 23, 2021

(54) TOUCH-SCREEN CONTROL DEVICE WITH HAPTIC FEEDBACK

(71) Applicant: Vestel Elektronik Sanayi ve Ticaret A. S., Manisa (TR)

(72) Inventor: Barbaros Kirisken, Manisa (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 130 days.

(21) Appl. No.: 16/306,995

(22) PCT Filed: May 18, 2017

(86) PCT No.: PCT/EP2017/062017
§ 371 (c)(1),
(2) Date: Dec. 4, 2018

(87) PCT Pub. No.: WO2018/010876
PCT Pub. Date: Jan. 18, 2018

(65) Prior Publication Data
US 2020/0310543 A1    Oct. 1, 2020

(30) Foreign Application Priority Data

Jul. 12, 2016 (EP) .................................... 16179061

(51) Int. Cl.
| | |
|---|---|
| *G06F 3/01* | (2006.01) |
| *G06F 3/041* | (2006.01) |
| *G06F 3/0484* | (2013.01) |
| *G06F 3/0488* | (2013.01) |
| *G06F 3/16* | (2006.01) |

(52) U.S. Cl.
CPC ............ *G06F 3/016* (2013.01); *G06F 3/0414* (2013.01); *G06F 3/04847* (2013.01);
(Continued)

(58) Field of Classification Search
None
See application file for complete search history.

(56) References Cited

U.S. PATENT DOCUMENTS

| | | |
|---|---|---|
| 2012/0013552 A1 | 1/2012 | Ahn |
| 2012/0327006 A1* | 12/2012 | Israr .................... G06F 3/016 345/173 |

(Continued)

FOREIGN PATENT DOCUMENTS

| | | |
|---|---|---|
| EP | 2 733 576 | 5/2014 |
| EP | 2733576 A1 | 5/2014 |

(Continued)

OTHER PUBLICATIONS

European Search Report for EP 16179061, dated Jan. 19, 2017.
(Continued)

*Primary Examiner* — Stephen T. Reed
(74) *Attorney, Agent, or Firm* — McDonnell Boehnen Hulbert & Berghoff LLP

(57) ABSTRACT

The present invention provides a haptic control device (203) for controlling a desired quantity via a touch-sensitive display screen (101) without providing any visual feedback. The device comprises a touch-sensitive display screen, a pressure measuring device, calculating means, adjustment means controlled by the calculating means, and a haptic actuator controlled by the calculating means. The pressure measuring device is configured to measure an amount of pressure applied by a user to the touch-sensitive display screen and a displacement of the applied pressure on the touch-sensitive display screen. The calculating means is configured to determine if the applied pressure exceeds a predetermined threshold value. If so, the calculating means controls the adjustment means to alter the desired quantity in dependence on the displacement of the applied pressure measured by the pressure measuring device, and also controls the haptic actuator to adjust surface friction of the touch-sensitive display screen in dependence on the displacement of the applied pressure measured by the pressure measuring device. The invention also provides a corre- (Continued)

sponding method of operating a haptic control device to control a desired quantity via a touch-sensitive display screen and an electronic device at least comprising such a haptic control device.

15 Claims, 8 Drawing Sheets

(52) U.S. Cl.
CPC ............ *G06F 3/04883* (2013.01); *G06F 3/16* (2013.01); *G06F 2203/014* (2013.01)

(56) References Cited

U.S. PATENT DOCUMENTS

2014/0267135 A1* 9/2014 Chhabra ............... G06F 3/0414
　　　　　　　　　　　　　　　　　　　　　　　　345/174
2017/0052622 A1* 2/2017 Smith ................... G06F 3/0416

FOREIGN PATENT DOCUMENTS

| EP | 2 889 727 | 7/2015 |
|----|-----------|--------|
| EP | 2889727 A1 | 7/2015 |
| JP | 2013-156685 | 8/2013 |
| JP | 2014-102830 | 6/2014 |

OTHER PUBLICATIONS

The International Search Report (ISR) for PCT/EP2017/062017 dated Jul. 19, 2017, pp. 1-4.
Written Opinion of the International Searching Authority for PCT/EP2017/062017 dated Jul. 19, 2017, pp. 1-7.

* cited by examiner

TOUCH-SCREEN CONTROL DEVICE WITH HAPTIC FEEDBACK

CROSS-REFERENCE TO RELATED APPLICATION

This application is a U.S. national phase of International Application No. PCT/EP2017/062017, filed May 18, 2017, which claims priority to European Patent Application No. 16179061.3, filed Jul. 12, 2016, both of which are incorporated by reference herein in their entirety.

The present invention relates to a haptic control device for controlling a desired quantity according to claim 1, an electronic device according to claim 4 and a method according to claim 5.

BACKGROUND OF THE INVENTION

It is known to provide haptic feedback to a user in response to pressure applied by the user to a touch-sensitive display screen. For example, WO 2014/201,151 A describes providing different haptic effects to a user according to different levels of pressure applied by the user to a touch-sensitive display screen. It is also known that a desired quantity, such as audio volume or screen brightness, can be controlled via a touch-sensitive display screen by displaying a slider, for example, on the touch screen, which the user can move in order to adjust the desired quantity. However, if screen content is being displayed on the touch-sensitive display screen at the same time, the desired quantity cannot be controlled via the screen in this manner without interrupting or overlaying with the slider at least a part of the screen content being displayed. At present, therefore, the desired quantity can only be controlled without interrupting or overlaying at least a part of the screen content by using some means other than the touch-sensitive display screen, such as mechanical controls, like physical buttons. For example, US 2013/0278552 A describes providing a protective case for an electronic device, such as a mobile phone, the protective case having a plurality of touch sensitive sensors.

OBJECT OF THE INVENTION

It is therefore an object of the invention to provide a haptic control device for controlling a desired quantity via a touch-sensitive display screen without visual feedback, an electronic device comprising such a haptic control device, and a method of controlling a desired quantity via a touch-sensitive display screen.

DESCRIPTION OF THE INVENTION

The object of the invention is solved by a haptic control device according to claim 1. Preferably, the device at least comprises a touch-sensitive display screen, a pressure measuring device, calculating means, adjustment means controlled by the calculating means, and a haptic actuator controlled by the calculating means. The pressure measuring device is to measure an amount of pressure applied by a user to the touch-sensitive display screen and a displacement of the applied pressure on the touch-sensitive display screen. The calculating means is to determine if the applied pressure exceeds a predetermined threshold value. If so, the calculating means controls the adjustment means to alter the desired quantity in dependence on the displacement of the applied pressure measured by the pressure measuring device. If the applied pressure exceeds the predetermined threshold value, the calculating means also controls the haptic actuator to adjust surface friction of the touch-sensitive display screen in dependence on the displacement of the applied pressure measured by the pressure measuring device.

The control device thereby provides haptic feedback to the user via a change in surface friction of the touch-sensitive display screen which indicates to the user that a change has also taken place in the desired quantity. Since both the change in surface friction and the change in the desired quantity are dependent on the displacement of the pressure applied by the user to the touch-sensitive display screen, the change in surface friction is correlated with the change in the desired quantity. This arrangement therefore allows the user to change the desired quantity by an amount which the user can sense through the change in surface friction, without any need for visual feedback to the user through the touch-sensitive display screen.

This solution is beneficial since it can be used to change the desired quantity whilst content is being displayed on the touch-sensitive display screen, without the need to interrupt or overlay at least a part of the screen content and without the need for any mechanical controls, such as physical buttons, to change the desired quantity. The screen content may, for example, be generated by an application, such as a game, running on an electronic device connected to or comprising the touch-sensitive display screen. Thus, with this solution, a user may maintain operation of the application displayed on the touch-sensitive display screen at the same time as and independently of controlling the desired quantity via the touch-sensitive display screen. Since the desired quantity is only controlled when the pressure applied by the user to the screen exceeds a predetermined threshold value, the user can still continue to interact with screen content displayed on the touch-sensitive display screen as normal, without a risk of accidentally altering the desired quantity when not intended.

Advantageous embodiments of the invention may be configured according to any claim and/or part of the following description.

The touch-sensitive display screen may be a projected capacitive touch (PCT or PCAP) screen, for example.

The pressure measuring device may be a pressure sensor of the touch-sensitive display screen or may be a pressure sensing layer additional to the touch-sensitive display screen. In a preferred embodiment, the pressure measuring device at least comprises a pressure sensing layer additional to the touch-sensitive display screen. This means that the pressure sensing layer measures the amount of pressure applied by a user to the touch-sensitive display screen and the displacement of the applied pressure in addition to whatever pressure sensing capabilities the touch-sensitive display screen already possesses by itself.

The calculating means may at least comprise a central and/or auxiliary processing unit of an electronic device connected to or comprising the touch-sensitive display screen. The calculating means is configured to determine if the applied pressure exceeds a predetermined threshold value. For example, US 2014/0267135 A describes setting a pressure threshold level for a touch sensing surface.

The adjustment means to alter the desired quantity may at least comprise a driver for and/or controller of the desired quantity. The desired quantity may be any one of audio volume, audio tone, backlight level, screen brightness, picture contrast, picture sharpness, colour or tint, and picture size, for example. Thus, for example, if the desired quantity is audio volume, the adjustment means preferably at least comprises a driver for a loudspeaker.

The haptic actuator to adjust the surface friction of the touch-sensitive display screen may use any convenient technology. This may at least comprise one or more of ultrasonic, electrovibration and mechanical technology. If the haptic actuator uses mechanical technology, it may at least comprise, for example, one or more linear resonant actuators (LRAs) or one or more eccentric rotating masses (ERMs). In a preferred embodiment, however, the haptic actuator at least comprises an electrovibration device. Electrovibration is a technology whereby if a user moves, for example, his finger across an insulated conducting surface to which a time-varying voltage is applied, the user experiences a feeling of surface friction so that the apparent roughness of the surface is changed. This surface friction may be created by a static electric field induced between the finger and the surface across which the finger is moved. The amount of surface friction experienced by the user can be varied by altering the voltage applied to the surface.

The present invention also relates to an electronic device comprising at least a haptic control device according to any one of claims 1 to 3. The electronic device may, for example, be a tablet computer, an ebook reader, a mobile phone, a laptop computer, a games console, an in-car computer system, a medical device or a home automation system. In a preferred embodiment, therefore, the touch-sensitive display screen is a touch-sensitive display screen of the electronic device and the calculating means may at least comprise a central and/or auxiliary processing unit of the electronic device.

The present invention further relates to a method of controlling a desired quantity via a touch-sensitive display screen. The method preferably at least comprises the steps of: maintaining the desired quantity invisible via the touch-sensitive display screen, setting a predetermined pressure threshold value, measuring a pressure applied by a user to the touch-sensitive display screen, and determining if the applied pressure exceeds the predetermined threshold value. If the applied pressure exceeds the predetermined threshold value, setting a surface friction of the touch-sensitive display screen to a first value, measuring a subsequent displacement of the applied pressure on the touch-sensitive display screen, and determining a direction in which the applied pressure moves. If the applied pressure moves in a first direction, adjusting the desired quantity by a first amount depending on the displacement of the applied pressure and adjusting the surface friction to a second value depending on the displacement of the applied pressure.

In a preferred embodiment, the method preferably also comprises the steps of: if the applied pressure moves in a second direction different from the first direction, adjusting the desired quantity by a second amount depending on the displacement of the applied pressure, and adjusting the surface friction to a third value depending on the displacement of the applied pressure.

If so, the second direction is preferably opposite to the first direction. If this is the case, in one alternative preferred embodiment, the first and second directions may lie along a substantially straight line. Thus a virtual slider is thereby created on the touch-sensitive display screen. In a second alternative preferred embodiment, the first direction may be counterclockwise and the second direction clockwise, whereby a virtual knob is created on the touch-sensitive display screen instead. In either case, the virtual slider or the virtual knob may be configured as a jog shuttle with any combination of "fast forward", "rewind", "slow motion", "pause", "stop" and "play" functions.

Preferably, if the desired quantity is decreased, the surface friction is decreased, whereas if the desired quantity is increased, the surface friction is increased. Thus if the desired quantity is audio volume for example, a user will experience increased surface friction as the volume gets louder and decreased surface friction as the volume gets quieter. However, the relationship between the change in the desired quantity and the change in the surface friction may instead be the other way round, so that if the desired quantity is screen brightness for example, the surface friction decreases as the screen gets brighter and the surface friction increases as the screen gets dimmer.

In one alternative preferred embodiment, the surface friction is adjusted linearly in proportion to the displacement of the applied pressure. This has the advantage of giving a smooth a consistent variation in the surface friction which can be used to provide haptic feedback for a smooth and continuously varying desired quantity, such audio volume, for example.

However, in a second alternative preferred embodiment, the surface friction is maintained at the first value until the displacement of the applied pressure reaches a transition point, whereupon the surface friction is adjusted to the second value. This has the advantage of giving a stepwise change in the surface friction which can be used to provide haptic feedback for a desired quantity having more than one discrete value, such as "on" and "off", for example.

Preferably, the method further comprises generating a sound in dependence on the displacement of the applied pressure. This has the advantage of providing audio feedback to enhance the haptic feedback provided by the change in surface friction felt by a user.

Preferably, the method further comprises displaying screen content generated by an application on the touch-sensitive display screen uninterrupted by controlling the desired quantity via the touch-sensitive display screen. This has the advantage of allowing a user to maintain operation of the application displayed on the touch-sensitive display screen independently of controlling the desired quantity via the touch-sensitive display screen. For example, if the application is a game, the user does not need to pause the game or overlay some of the displayed screen content in order to adjust the desired quantity, and the adjustment of the desired quantity without interrupting the displayed screen content from the application can also be achieved without the need for any additional mechanical controls, such as buttons, for example.

Preferably, the desired quantity is any one of audio volume, audio tone, backlight level, screen brightness, picture contrast, picture sharpness, colour or tint, and picture size.

The present invention further relates to a computer program product or a program code or system for executing one or more than one of the herein described methods.

Further features, goals and advantages of the present invention will now be described in association with the accompanying drawings, in which exemplary components of the invention are illustrated. Components of the devices and methods according to the invention which are at least essentially equivalent to each other with respect to their function can be marked by the same reference numerals, wherein such components do not have to be marked or described in all of the drawings.

In the following description, the invention is described by way of example only with respect to the accompanying drawings.

DETAILED DESCRIPTION

Figure 1:
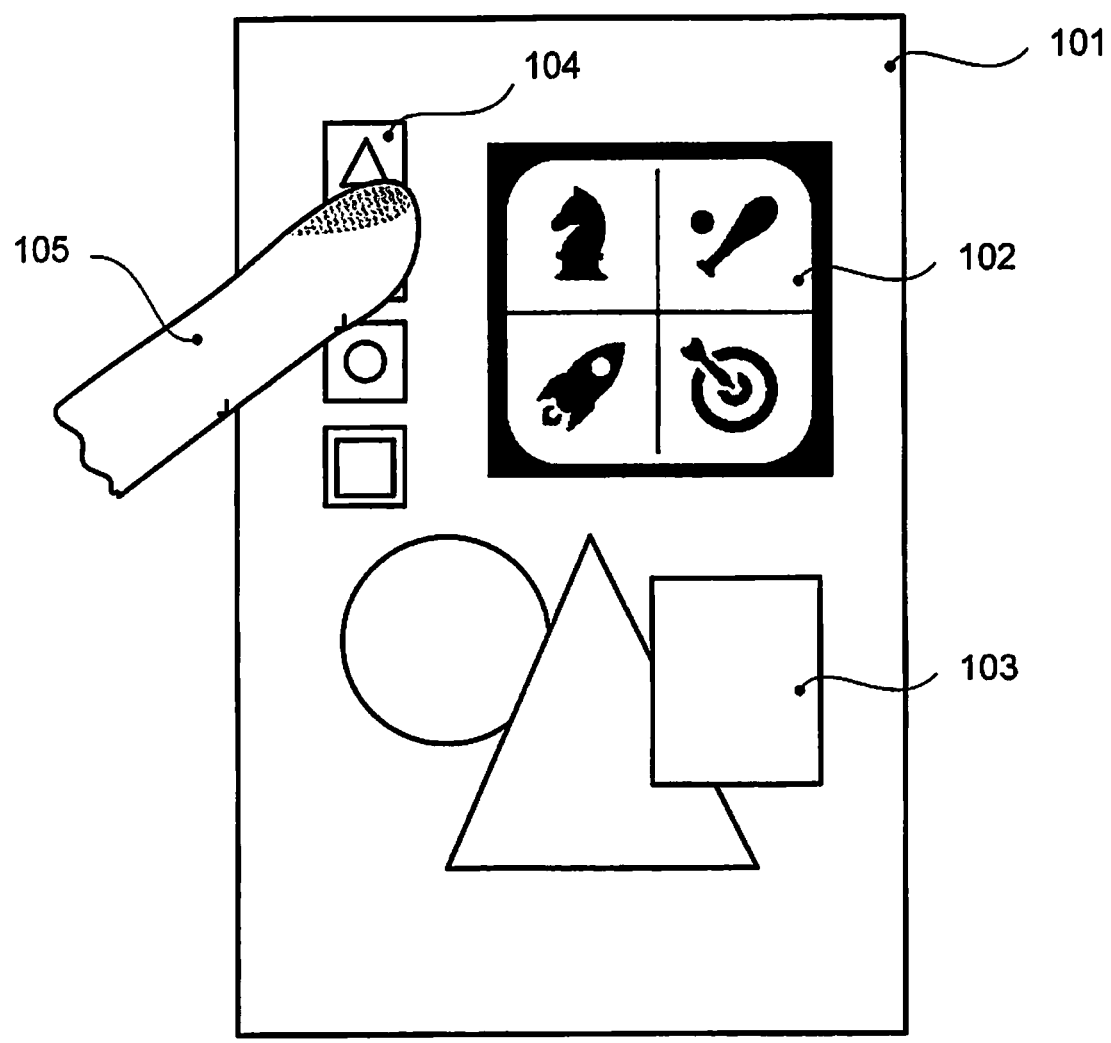
FIG. 1 is a schematic plan view of a user interacting with a touch screen of an electronic device.

FIG. 1 schematically shows a touch screen 101 of an electronic device displaying content from an application running on the electronic device, such as a game, for example. The electronic device may be a tablet computer or a mobile phone, for example. The content displayed on touch screen 101 comprises first screen content 102 displayed in a first part of the touch screen 101 and second screen content 103 displayed in a second part of the touch screen 101, for example. Also displayed in a third part of the screen 101, there are one or more visible buttons 104, which may be for controlling the game in this example. A user can therefore control the game by operating the buttons 104 with his finger 105. The first and second screen content 102, 103 and the control buttons 104 may between them occupy the entire touch screen 101. The touch screen 101 may allow the electronic device to detect an input from the user's finger 105 to one or more of control buttons 104 by projected capacitive touch (PCT or PCAP), for example, to sense a pressure applied by the user to the touch screen 101. FIG. 1 shows a state of the touch screen 101 when no haptic control device is in operation via the touch screen 101, in other words, when the pressure applied by the user to the touch screen 101 is below a predetermined threshold value.

Figure 2:
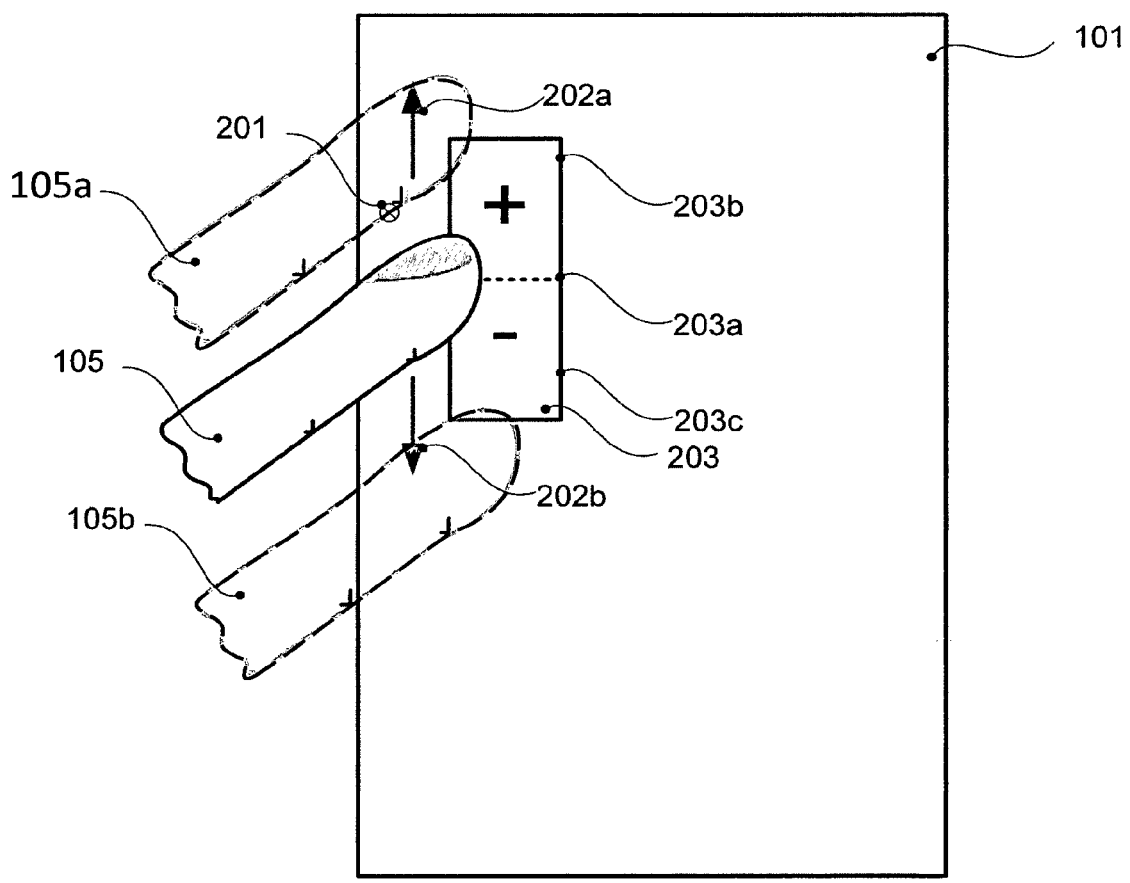
FIG. 2 is a schematic plan view of a first embodiment of a haptic control device which is a virtual slider on a touch screen of an electronic device.

FIG. 2 schematically shows a first embodiment of a haptic control device which is operational when the pressure applied by the user to the touch screen 101 exceeds a predetermined threshold value. In this embodiment, the haptic control device is a virtual slider 203 on a touch screen 101 of an electronic device. The electronic device may be a tablet computer or a mobile phone, for example. In reality, the virtual slider 203 is not actually displayed on touch screen 101, and is only shown in FIG. 2 for the purposes of demonstration and for better understanding the principles behind the present invention. In FIG. 2, a user's finger is again represented by reference numeral 105. 201 represents pressure applied through the screen 101 by the user into the plane of the page of FIG. 2. In practice, virtual slider 203 is a haptic slider, which can be operated by the user to control a level of a desired quantity, such as audio volume or screen brightness, for example, in the following manner.

When the pressure applied by the user's finger 105 through the touch screen 101 exceeds a predetermined threshold value, the virtual slider 203 starts to work at a location 203a on touch screen 101 wherever the pressure passes this threshold value. 203a therefore represents a midpoint or neutral condition of the virtual slider 203. If the user then slides his finger up the screen whilst maintaining the applied pressure above the threshold value, in the direction of arrow 202a to the position 105a shown in dashed outline in FIG. 2, this has the effect of increasing the desired quantity which the slider controls. If, on the other hand, the user slides his finger down the screen, again whilst maintaining the applied pressure above the threshold value, in the direction of arrow 202b to the position 105b also shown in dashed outline in FIG. 2, this instead has the effect of decreasing the desired quantity which the slider controls. In this example, therefore, 203b represents an area of the touch screen 101 with an up condition of the virtual slider 203, and 203c represents an area of the touch screen 101 with a down condition of the virtual slider 203. The virtual slider 203 continues to work as such until the pressure applied by the user through the touch screen 101 drops back down below the threshold value once again. According to this embodiment, the surface friction felt by the user's finger 105 also increases as the user increases the desired quantity, such as audio volume or screen brightness, using the virtual slider 203, whereas the surface friction felt by the user's finger 105 decreases if the user instead decreases the desired quantity using the virtual slider 203. Thus the user experiences a haptic feedback with operation of the virtual slider 203, which gives the user a feel of the level of the desired quantity, even though the user cannot see the virtual slider 203 on the touch screen 101.

Figure 3:
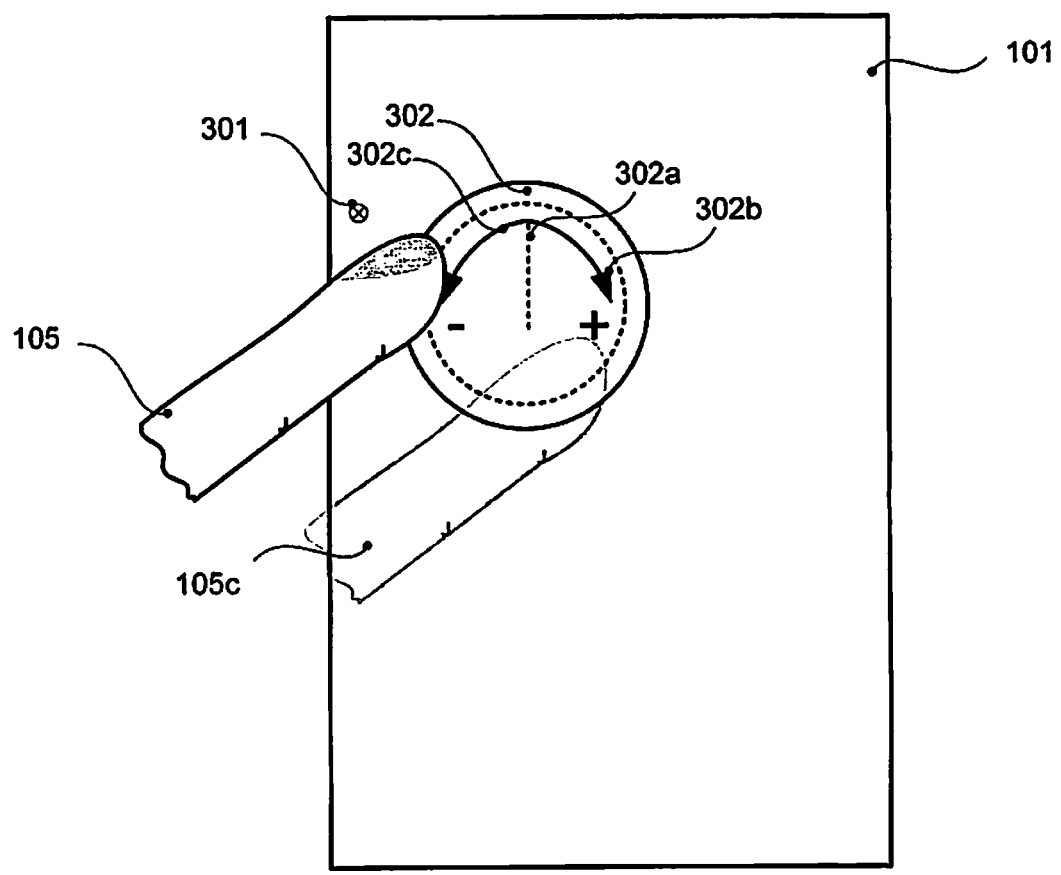
FIG. 3 is a schematic plan view of a second embodiment of a haptic control device which is a virtual knob on a touch screen of an electronic device.

FIG. 3 schematically shows a second embodiment of a haptic control device which is operational when the pressure applied by the user to the touch screen 101 exceeds a predetermined threshold value. In this embodiment, the haptic control device is a virtual knob 302 on a touch screen 101 of an electronic device. The electronic device may again be a tablet computer or a mobile phone, for example. In reality, the virtual knob 302 is not displayed on touch screen 101, and is only shown in FIG. 3 for the purposes of demonstration and for better explaining the principles behind the present invention. In FIG. 3, a user's finger is again represented by reference numeral 105. 301 represents pressure applied through the screen 101 by the user into the plane of the page of FIG. 3. In practice, virtual knob 302 is a haptic knob, which can be operated by the user to control a level of a desired quantity, such as audio volume or screen brightness, for example, in the following manner.

When the pressure applied by the user's finger 105 through the touch screen 101 exceeds a predetermined threshold value, the virtual knob 302 starts to work at a location 302a on touch screen 101 wherever the pressure passes this threshold value. 302a therefore represents a neutral condition and start point for operation of the virtual knob 302. If the user then slides his finger clockwise whilst maintaining the applied pressure above the threshold value, to the position 105c shown in ghost outline in FIG. 3, this has the effect of increasing the desired quantity which the knob controls. If, on the other hand, the user slides his finger counterclockwise whilst maintaining the applied pressure above the threshold value, back to position 105, this instead has the effect of decreasing the desired quantity which the knob controls. In this example, therefore, 302b represents an area of the touch screen 101 with an up condition of the virtual knob 302, and 302c represents an area of the touch screen 101 with a down condition of the virtual knob 302. The virtual knob 302 continues to work as just described until the pressure applied by the user through the touch screen 101 drops back down below the threshold value once again. According to this embodiment, the surface friction felt by the user's finger 105 also increases as the user increases the desired quantity, such as the audio volume or screen brightness, using the virtual knob 302, whereas the surface friction felt by the user's finger 105 decreases if the user instead decreases the desired quantity using the virtual knob 302. Thus the user experiences a haptic feedback with operation of the virtual knob 302, which gives the user a feel of the level of the desired quantity, even though the user cannot see the virtual knob 302 on the touch screen 101.

Figure 4:
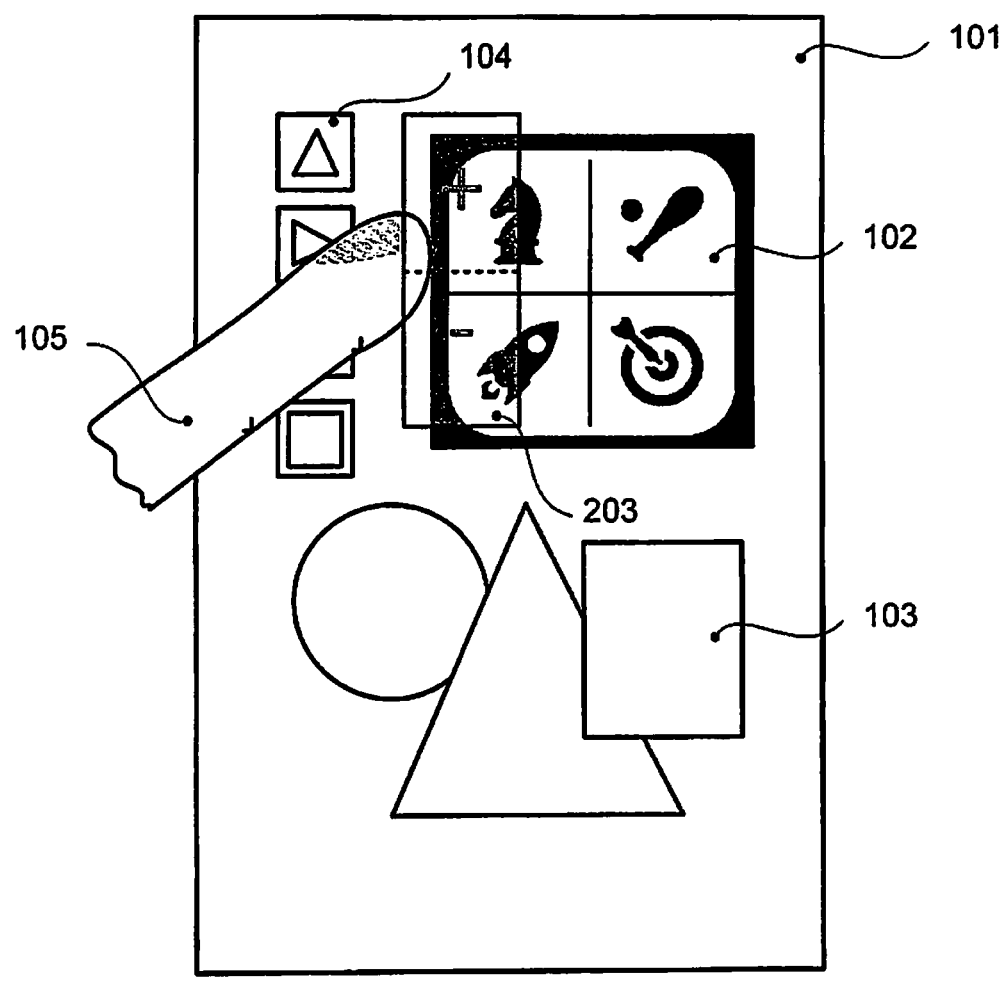
FIG. 4 is a schematic plan view of the virtual slider of FIG. 2 in operation whilst an application is being displayed on a touch screen of an electronic device.

FIG. 4 schematically shows the virtual slider 203 of FIG. 2 in operation whilst an application such as that shown and described above in relation to FIG. 1 is being displayed on the touch screen 101 of an electronic device. The electronic device may again be a tablet computer or a mobile phone, for example, and the application running on the electronic device may again be a game, for example, having first screen content 102, second screen content 103 and buttons for control thereof, 104. The virtual slider 203 is shown in ghost outline in FIG. 4 because in reality, the virtual slider 203 is not actually displayed on touch screen 101 and is instead only operated if pressure applied by the user's finger 105 to touch screen 101 exceeds a predetermined threshold value, whilst operation of the virtual slider 203 is sensed by the user through haptic feedback of variable surface friction felt by the user's finger 105.

Thus the user is able to adjust a desired quantity, such as the audio volume or screen brightness, for example, in the manner described above in relation to FIG. 2, without having to interrupt operation of the application being displayed on touch screen 101 and without having to overlay, obstruct or otherwise interfere with the display of the screen content 102, 103 and control buttons 104 of the application being displayed. In particular, as shown in FIG. 4, the virtual slider 203 does not obscure the first screen content 102, even though in this example, it is positioned on touch screen 101 at a location which at least partially coincides with the first screen content 102.

Figure 5:
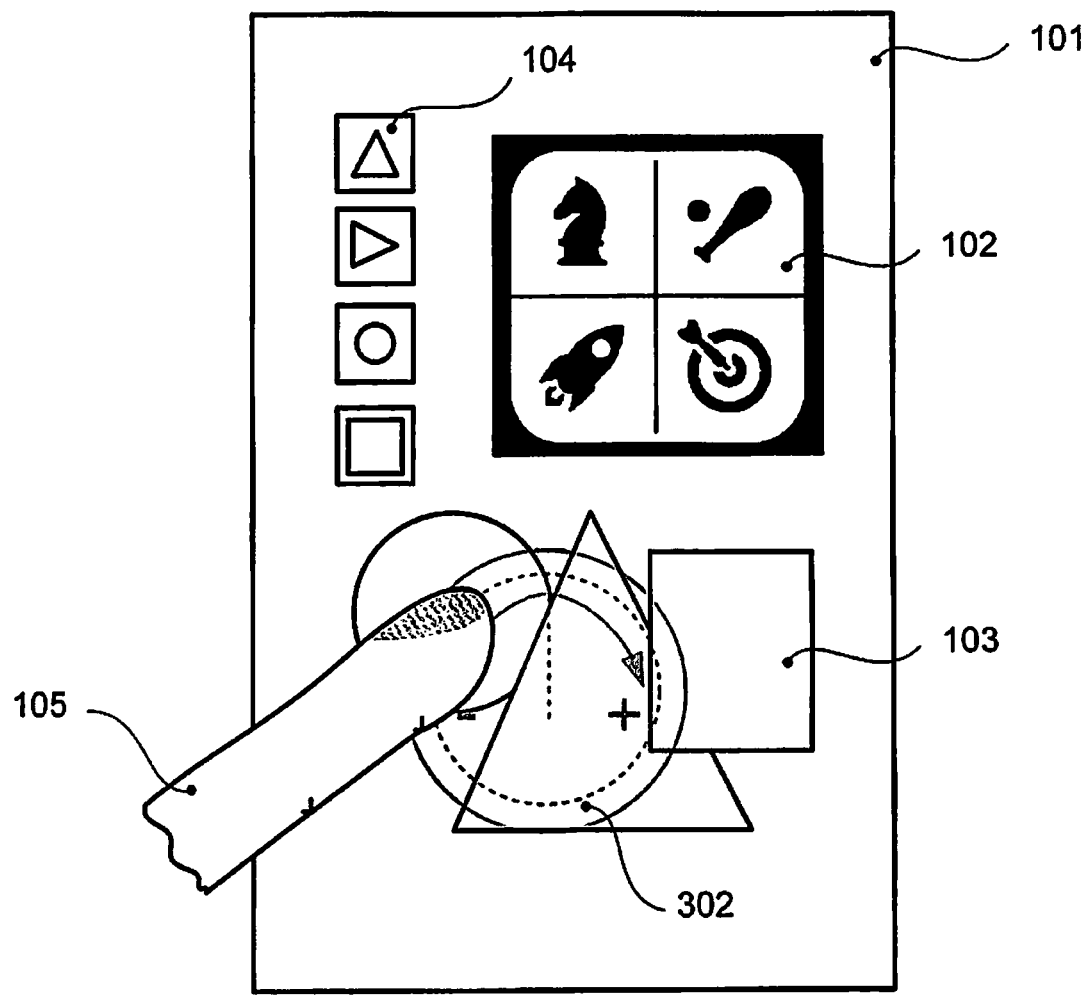
FIG. 5 is a schematic plan view of the virtual knob of FIG. 3 in operation whilst an application is being displayed on a touch screen of an electronic device.

FIG. 5 schematically shows the virtual knob 302 of FIG. 3 in operation whilst an application such as that shown and described above in relation to FIG. 1 is being displayed on the touch screen 101 of an electronic device. The electronic device may again be a tablet computer or a mobile phone, for example, and the application running on the electronic device may again be a game, for example, having first screen content 102, second screen content 103 and control buttons 104. The virtual knob 302 is shown in ghost outline in FIG. 5 because in reality, the virtual knob 302 is not actually displayed on touch screen 101 and is instead only operated if pressure applied by the user's finger 105 to touch screen 101 exceeds a predetermined threshold value, whilst operation of the virtual knob 302 is sensed by the user through haptic feedback of variable surface friction felt by the user's finger 105. Thus the user is able to adjust a desired quantity, such as the audio volume or screen brightness, for example, in the manner described above in relation to FIG. 3, without having to interrupt operation of the application being displayed on touch screen 101 and without having to overlay, obstruct or otherwise interfere with the display of the screen content 102, 103 and control buttons 104 of the application being displayed. In particular, as shown in FIG. 5, the virtual knob 302 does not obscure the second screen content 103, even though in this example, it is positioned on touch screen 101 at a location which at least partially coincides with the second screen content 103.

Figure 6A:
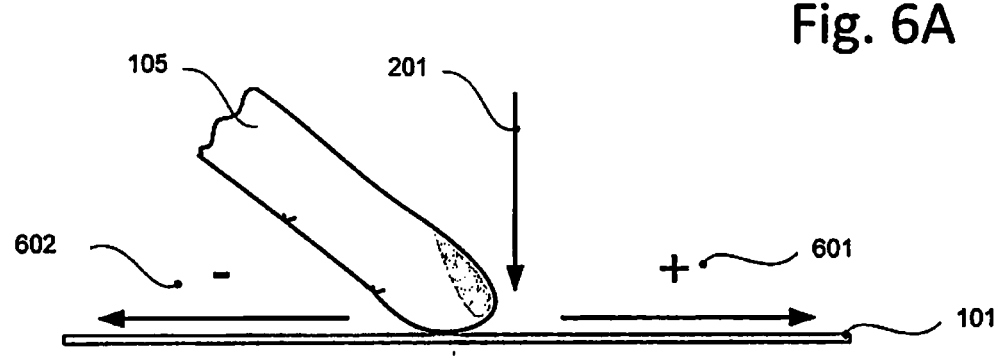
FIG. 6A is a schematic side view of a user's finger interacting with a touch screen of an electronic device.

Whereas the specific embodiments described above in relation to FIGS. 2 to 5 have been described in relation to the examples of a virtual slider 203 and a virtual knob 302, a haptic control device according to the invention may take any desired form, including, but not limited to, one or more virtual switches and/or buttons, a virtual joystick, a virtual keypad and/or keyboard, or any other form which is preferred. FIG. 6A schematically shows a user's finger 105 interacting with a touch screen 101 of an electronic device. As in FIG. 2, arrow 201 represents pressure applied through the touch screen 101 by the user. 601 represents a region of the touch screen 101 where, provided that the user maintains the applied pressure above a predetermined threshold value, a desired quantity can be increased by the user and where the surface friction experienced by the user is also increasing. In contrast, 602 represents a region of the touch screen 101 where, provided that the user maintains the applied pressure above the predetermined threshold value, the desired quantity can be decreased by the user and where the surface friction experienced by the user is also decreasing.

Figure 6B:
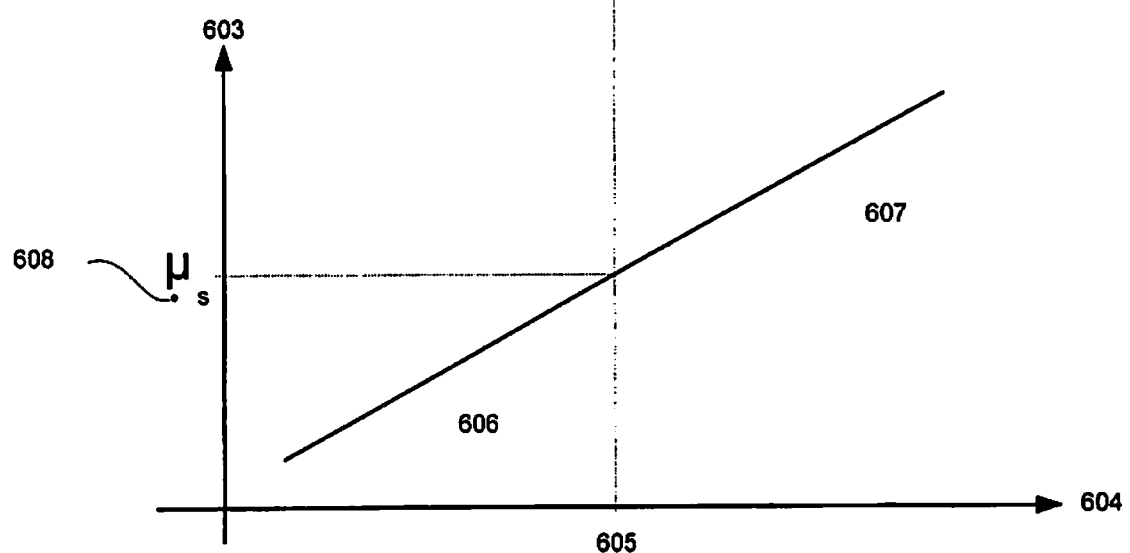
FIG. 6B is a graph showing an example of how a coefficient of friction of a touch screen may be varied with displacement of a user's finger thereon.

FIG. 6B is a graph corresponding to FIG. 6A, which shows an example of how the coefficient of friction of the touch screen 101 may be varied with displacement of the user's finger 105 thereon. X-axis 604 represents the displacement of the user's finger 105 along the screen 101, whilst Y-axis 603 represents the coefficient of friction, $\mu_s$, of the surface. In this example, the coefficient of friction, $\mu_s$, varies linearly with the displacement of the user's finger 105, so that when the user first applies pressure above the predetermined threshold value to commence operation of the haptic control device, at the midpoint or neutral condition 605 of the haptic control device, the user experiences a middling value 608 for the coefficient of friction, $\mu_s$. On the other hand, as the user's finger 105 is moved into the region 602 where, provided that the user maintains the applied pressure above the predetermined threshold value, the desired quantity is decreased, the user also experiences a decrease 606 in the coefficient of friction, $\mu_s$, whereas as the user's finger 105 is moved into the region 601 where, provided that the user maintains the applied pressure above the predetermined threshold value, the desired quantity is increased, the user also experiences an increase 607 in the coefficient of friction, $\mu_s$, of the touch screen 101. Whereas in the exemplary embodiment shown in FIG. 6B, the coefficient of friction, $\mu_s$, varies linearly with the displacement of the user's finger 105 as just described, in other alternative embodiments, the coefficient of friction, $\mu_s$, could instead be varied in some other fashion according to the displacement of the user's finger 105. For example, the coefficient of friction, $\mu_s$, could instead be varied quadratically or exponentially according to the displacement of the user's finger 105, or even inversely proportionally thereto. The coefficient of friction, $\mu_s$, could instead be maintained substantially constant as the user's finger 105 is moved initially and until such time as the user's finger reaches a transition point, whereupon the coefficient of friction, $\mu_s$, could be suddenly either increased or decreased to another, different but substantially constant value. The coefficient of friction could also be varied depending on the displacement of the user's finger 105 to have more than one such sudden transition. In fact, the relationship between the coefficient of friction, $\mu_s$, and the displacement of the user's finger 105 can be chosen as desired.

Figure 7:
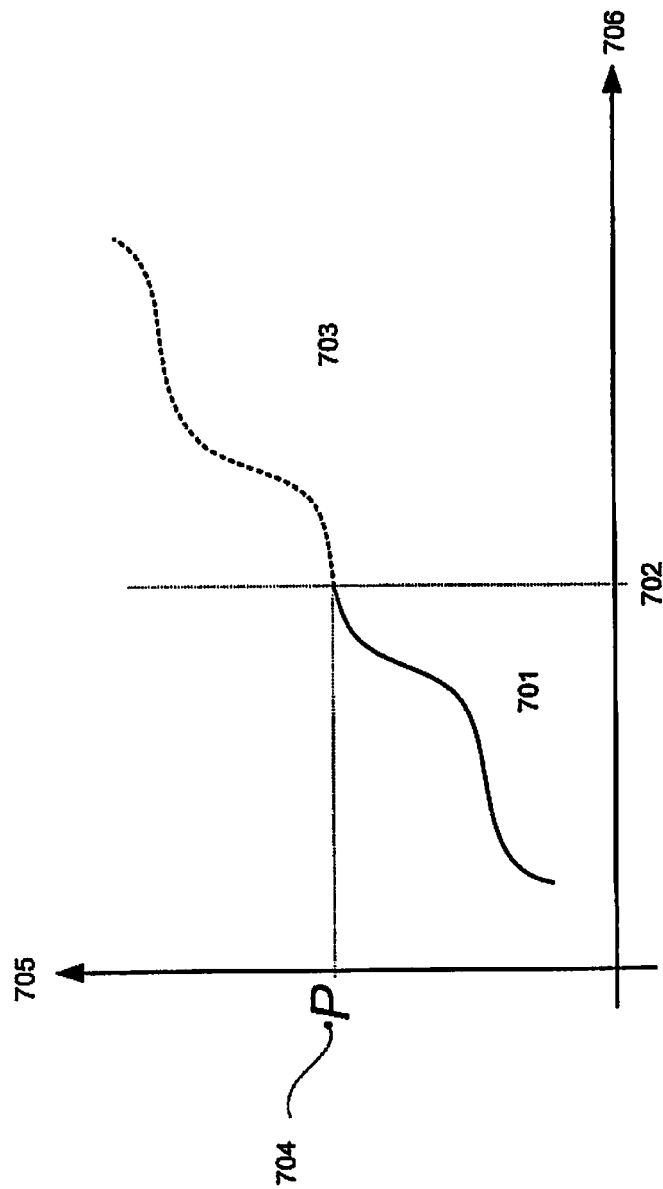
FIG. 7 is a graph showing an example of how pressure from a user's finger on a touch screen may vary with time.

FIG. 7 is a graph plotting an example of pressure applied by a user's finger 105 on the Y-axis 705 over time, measured on the X-axis 706. In a first region 701 of the graph, the pressure applied by the user's finger 105 is below the predetermined threshold value 704, above which the haptic control device starts to work, and the touch screen 101 continues with normal measurements of the pressure applied thereto by the user's finger 105. At time 702, the pressure applied by the user's finger 105 reaches the predetermined threshold value 704 and the haptic control device commences operation. In a second region 703 of the graph, the touch screen 101 continues with normal measurements of the pressure applied thereto by the user's finger 105, but since the user is also maintaining the applied pressure above the predetermined threshold value 704, the haptic control device continues to work according to the principles explained above by way of example in relation to FIGS. 2 and 3. The haptic control device will only cease to work at a later time if the pressure applied by the user's finger drops back down below the predetermined threshold value 704.

Figure 8:
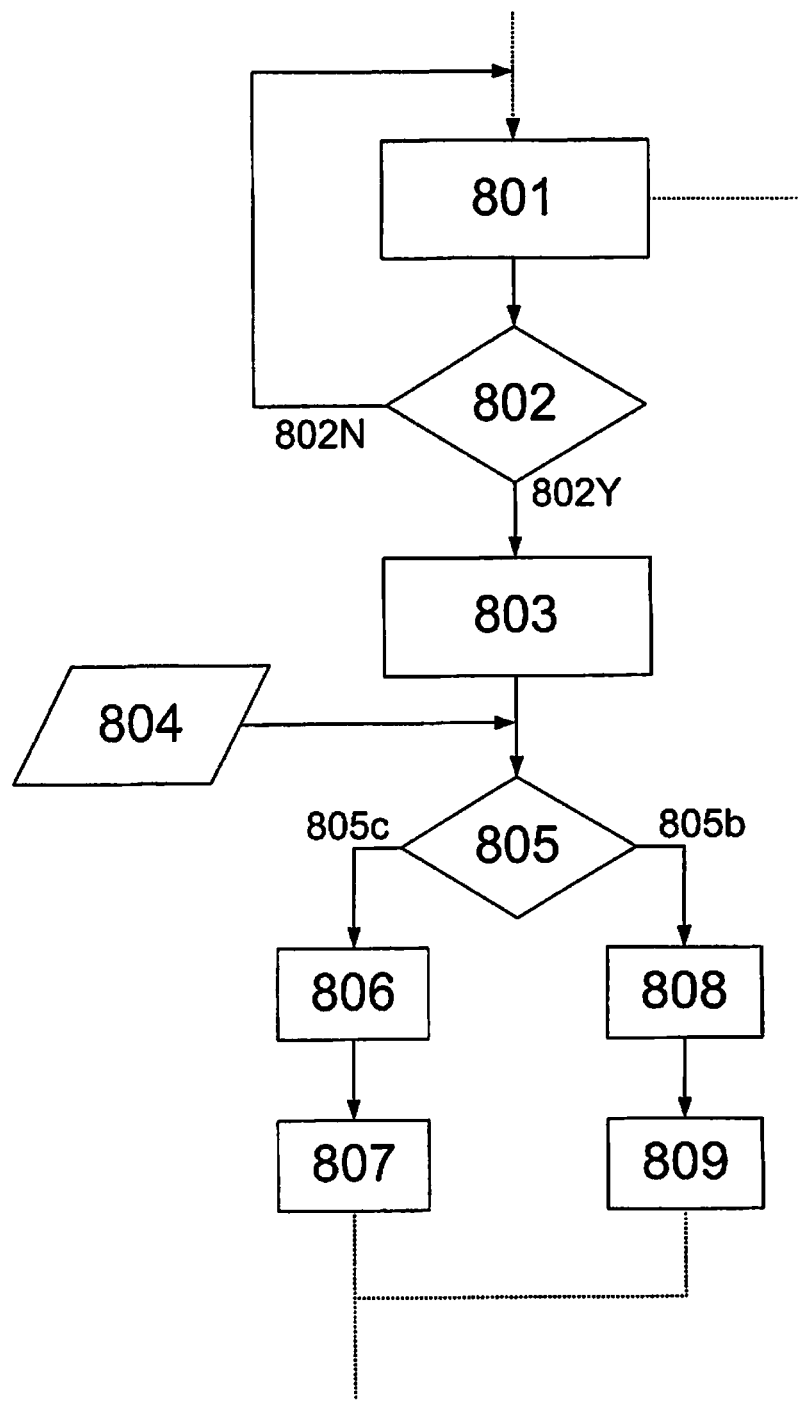
FIG. 8 is a flow diagram showing an embodiment of a method of operating a haptic control device to control a desired quantity.

FIG. 8 is a flow diagram showing an embodiment of a method of operating a haptic control device to control a desired quantity via a touch-sensitive display screen. The method commences at step 801, wherein the pressure applied by a user to the touch screen 101 is measured. In step 802, the method determines whether a predetermined threshold pressure has been exceeded. If not, the method recirculates via path 802N to step 801 to re-measure the pressure applied by the user again. If so, however, the method passes via path 802Y to step 803, wherein the pressure applied by the user is measured in order to determine not just the amount of pressure applied by the user to the touch screen 101, but also the displacement of the applied pressure, in other words, how the user's finger 105 moves across touch screen 101. At this point, a desired quantity for adjustment by the user is accessed in step 804. In step 805, the method then determines in which direction the user's finger has been detected to move. If the user's finger has been detected to move in a decreasing direction of the haptic control device, then the method passes via path 805c to step 806, wherein the surface friction felt by the user is decreased, and to step 807, wherein the desired quantity for adjustment by the user is also decreased, both being decreased by an amount determined by the detected displacement of the user's finger. If, on the other hand, the user's finger has been detected to move in an increasing direction of the haptic control device, then the method passes via path 805b to step 808, wherein the surface friction felt by the user is increased, and to step 809, wherein the desired quantity for adjustment by the user is also increased, both being increased by an amount determined by the detected displacement of the user's finger. Once both the surface friction and the desired quantity have been adjusted in this manner, whether to be increased or decreased, the method then recirculates back to step 801 to recommence operation as described above once more.

In summary, therefore, the present invention provides a haptic control device for controlling a desired quantity via a touch-sensitive display screen without providing any visual feedback. The device comprises a touch-sensitive display screen, a pressure measuring device, calculating means, adjustment means controlled by the calculating means, and a haptic actuator controlled by the calculating means. The pressure measuring device is configured to measure an amount of pressure applied by a user to the touch-sensitive display screen and a displacement of the applied pressure on the touch-sensitive display screen. The calculating means is configured to determine if the applied pressure exceeds a predetermined threshold value. If so, the calculating means controls the adjustment means to alter the desired quantity in dependence on the displacement of the applied pressure measured by the pressure measuring device, and also controls the haptic actuator to adjust surface friction of the touch-sensitive display screen in dependence on the displacement of the applied pressure measured by the pressure measuring device. The invention also provides a corresponding method of operating a haptic control device to control a desired quantity via a touch-sensitive display screen and an electronic device at least comprising such a haptic control device.

| Reference Numerals: | |
|---|---|
| 101 | Touch screen |
| 102 | First screen content |
| 103 | Second screen content |
| 104 | Control buttons displayed on touch screen |
| 105 | Finger of user |
| 105a | User's finger slides up with pressure above threshold |
| 105b | User's finger slides down with pressure above threshold |
| 105c | Position of user's finger whilst turning knob |
| 201 | Pressure applied through the screen by user |
| 202a | Sliding up to increase desired quantity |
| 202b | Sliding down to decrease desired quantity |
| 203 | Virtual slider |
| 203a | Neutral condition of slider |
| 203b | Virtual slider up condition |
| 203c | Virtual slider down condition |
| 301 | Pressure applied by user |
| 302 | Virtual knob |
| 302a | Neutral and start condition of knob |
| 302b | Increasing condition of knob where surface friction is also changed |
| 302c | Decreasing condition of knob where surface friction is also changed |
| 601 | Increasing region where friction is also increasing |
| 602 | Decreasing region where friction is also decreasing |
| 603 | Friction coefficient of surface |
| 604 | Displacement of user's finger |
| 605 | Neutral condition |
| 606 | Decrease in surface friction coefficient |
| 607 | Increase in surface friction coefficient |
| 608 | Surface friction in neutral condition |
| 701 | Normal pressure measurement (system not working) |
| 702 | Time when pressure limit reached |
| 703 | Pressure measurement still continuing but system starts to work |
| 704 | Pressure threshold |
| 705 | Pressure |
| 706 | Time |
| 801 | Pressure measurement |
| 802 | Is pressure threshold reached? |
| 802Y | Yes |
| 802N | No |
| 803 | Measure applied pressure |
| 804 | Desired quantity |
| 805 | Which way is finger moving? |
| 805b | Increasing direction |
| 805c | Decreasing direction |
| 806 | Decrease surface friction |
| 807 | Decrease desired quantity |
| 808 | Increase surface friction |
| 809 | Increase desired quantity |

The invention claimed is:

1. A haptic control device for controlling a desired quantity, the device at least comprising:
a touch-sensitive display screen;
a pressure measuring device to measure an amount of pressure applied by a user to the touch-sensitive display screen and a displacement of the applied pressure on the touch-sensitive display screen;
calculating means to determine if the applied pressure exceeds a predetermined threshold value;
adjustment means controlled by the calculating means to alter the desired quantity in dependence on the displacement of the applied pressure measured by the pressure measuring device; and
a haptic actuator controlled by the calculating means to adjust surface friction of the touch-sensitive display screen in dependence on the displacement of the applied pressure measured by the pressure measuring device;
wherein a virtual controller is provided on the touch-sensitive display screen for controlling the desired quantity with haptic feedback and without graphically displaying the virtual controller if the applied pressure exceeds the predetermined threshold value.

2. The haptic control device according to claim 1, wherein the pressure measuring device at least comprises a pressure sensing layer additional to the touch-sensitive display screen.

3. The haptic control device according to claim 1, wherein the haptic actuator at least comprises an electrovibration device.

4. An electronic device comprising at least the haptic control device according to claim 1.

5. A method of controlling a desired quantity via a touch-sensitive display screen, the method at least comprising:
presenting a virtual controller of the desired quantity, which provides haptic feedback without graphically displaying the virtual controller via the touch-sensitive display screen;
setting a predetermined pressure threshold value;
measuring a pressure applied by a user to the touch-sensitive display screen;
determining if the applied pressure exceeds the predetermined threshold value;
if the applied pressure exceeds the predetermined threshold value, setting a surface friction of the touch-sensitive display screen to a first value and measuring a subsequent displacement of the applied pressure on the touch-sensitive display screen;
determining a direction in which the applied pressure moves;
if the applied pressure moves in a first direction, adjusting the desired quantity by a first amount depending on the displacement of the applied pressure, and adjusting the surface friction to a second value depending on the displacement of the applied pressure.

6. The method according to claim 5, further comprising:
if the applied pressure moves in a second direction different from the first direction, adjusting the desired quantity by a second amount depending on the displacement of the applied pressure, and adjusting the surface friction to a third value depending on the displacement of the applied pressure.

7. The method according to claim 6, wherein the second direction is opposite to the first direction.

8. The method according to claim 7, wherein the first and second directions are along a substantially straight line, thereby creating a virtual slider without graphically displaying the virtual slider on the touch-sensitive display screen.

9. The method according to claim 7, wherein the first direction is counterclockwise and the second direction is clockwise, thereby creating a virtual knob without graphically displaying the virtual knob on the touch-sensitive display screen.

10. The method according to claim 5, wherein if the desired quantity is decreased, the surface friction is decreased, whereas if the desired quantity is increased, the surface friction is increased.

11. The method according to claim 5, wherein the surface friction is adjusted linearly in proportion to the displacement of the applied pressure.

12. The method according to claim 5, wherein the surface friction is maintained at the first value until the displacement of the applied pressure reaches a transition point, whereupon the surface friction is adjusted to the second value.

13. The method according to claim 5, further comprising generating a sound in dependence on the displacement of the applied pressure.

14. The method according to claim 5, further comprising displaying screen content generated by an application on the touch-sensitive display screen uninterrupted by controlling the desired quantity via the touch-sensitive display screen.

15. The method according to claim 5, wherein the desired quantity is any one of audio volume, audio tone, backlight level, screen brightness, picture contrast, picture sharpness, colour or tint, and picture size.

* * * * *